(12) United States Patent
Deimert et al.

(10) Patent No.: US 7,123,187 B2
(45) Date of Patent: Oct. 17, 2006

(54) TECHNIQUE FOR DETERMINING RELATIVE YAW USING PHASE WINDUP

(75) Inventors: Kim Deimert, Balzac (CA); Brian D. Smith, Calgary (CA)

(73) Assignee: NovAtel, Inc., Calgary (CA)

( * ) Notice: Subject to any disclaimer, the term of this patent is extended or adjusted under 35 U.S.C. 154(b) by 121 days.

(21) Appl. No.: 11/010,513

(22) Filed: Dec. 13, 2004

(65) Prior Publication Data

US 2006/0125686 A1    Jun. 15, 2006

(51) Int. Cl.
*G01S 5/14*    (2006.01)
*G01C 21/00*    (2006.01)

(52) U.S. Cl. .................. 342/357.11; 701/213; 702/151
(58) Field of Classification Search ............ 342/357.11
See application file for complete search history.

(56) References Cited

U.S. PATENT DOCUMENTS 6,005,514 A * 12/1999 Lightsey ..................... 342/365
6,593,879 B1 * 7/2003 Campbell ............... 342/357.11

OTHER PUBLICATIONS

Ford, et al., "Beeline RT20—a Compact, Medium Precision Positioning System With An Attitude", Proceedings, 1997 Institute of Navigation Conference 1997, Kansas City, Missouri.

* cited by examiner

*Primary Examiner*—Gregory C. Issing
(74) *Attorney, Agent, or Firm*—Cesari and McKenna, LLP

(57) ABSTRACT

A technique uses "phase windup" to determine relative yaw of a craft from a plurality circularly polarized signals transmitted from one or more transmission sources. A first difference in carrier phase measurements taken simultaneously at time $t_1$ is determined for first and second circularly polarized signals from a given transmitting source A second difference is then determined from simultaneous carrier phase measurements taken at time $t_2$. A third difference, which is the difference between the first and second differences, is then used to determine the relative yaw based on a difference in wavelengths of the two signals. If more than one transmitting source is in view, a mean average of the third differences associated with the respective transmitting sources may be used to determine the relative yaw.

22 Claims, 3 Drawing Sheets

TECHNIQUE FOR DETERMINING RELATIVE YAW USING PHASE WINDUP

BACKGROUND OF THE INVENTION

1. Field of the Invention

The present invention relates generally to Global Navigation Satellite Systems (GNSS) receivers and, more particularly, to methods employed by the GNSS receivers to determine relative yaw.

2. Background Information

Passive ranging systems, such as Global Navigation Satellite Systems (GNSS), employ satellites to provide signals that enable a GNSS receiver to determine its position, e.g., its latitude and longitude. If a sufficient number of GNSS satellites are in the view of the receiver, the receiver also uses the signals to determine height or altitude.

The GNSS receivers utilize codes and data that are contained in the GNSS signals to determine position. A GPS receiver, for example, determines its position using the PRN codes and data that are broadcast on the L1 frequency and the PRN codes that are broadcast on the L2 frequency, with each satellite transmitting different L1 and L2 codes. The GPS receiver, operating in a known manner, synchronizes locally generated PRN codes to the received PRN codes and calculates the times it took for the transmitted codes to reach the receiver from the respective satellites. The GPS receiver then uses the travel times in conjunction with information contained in the transmitted data (e.g., satellite locations, clock information, ionospheric delay modeling information) to determine latitude, longitude and, as appropriate, altitude. Generally, the receiver requires the signals from three GPS satellites to determine position and the signals from four GPS satellites to determine altitude.

GPS signals may also be used in a craft (e.g., an aircraft) to determine the pitch, roll and yaw, or heading, of the craft. Here, pitch is defined as rotation around an "x" axis, roll as rotation around a "y" axis and yaw as rotation around a "z" axis. A prior technique that may be used to measure one axis attitude, using a GPS system is described in T. Ford et al., "Beeline RT20—a Compact, Medium Precision Positioning System with an Attitude;" Proceedings, 1997 Institute of Navigation Conference 1997, Kansas City, Mo. The technique uses two GPS antennas that are spaced apart by a predetermined distance and calculates the one axis attitude based on a known or determined baseline between one of the antennas and a base station. Using the attitude, the system then calculates yaw. Relative yaw may be described as a rate of change in the yaw or heading. The above-described technique for determining yaw may be modified to determine relative yaw by determining an initial yaw measurement at a time $t_1$ and determining a successive yaw measurement at a later time $t_2$ and determining the difference between the two measurements.

One problem with determining relative yaw using the above-described technique is that the system requires the circuitry necessary to determine yaw, namely, the two antennas and the corresponding sets of GPS receive circuitry to accommodate the antennas. Further, the system must make the relatively complex calculations required to compute the three axis attitude. Further, the receiver requires the signals from at least four satellites to determine the yaw and the associated relative yaw. Thus, the receiver may be precluded from determining yaw in various environments.

SUMMARY OF THE INVENTION

The present invention overcomes disadvantages of the prior art by incorporating a technique that enables a Global Navigation Satellite System (GNSS) receiver to determine relative yaw using a single antenna. Further, the technique may be used even if only one satellite is in the view of the GNSS receiver.

The inventive technique determines relative yaw by taking advantage of a well-known effect, known as "phase windup," that is associated with circularly polarized signals emanating from GNSS satellites. The phase windup effect, long considered a source of error or noise in GNSS position calculations produces either a perceived loss or gain of a carrier cycle or portions thereof in the carrier phase measurements when the antenna is rotated. The gain is perceived when the antenna is rotated in the same direction as the circular polarization and a loss is perceived when the antenna is rotated in the opposite direction. We calculate relative yaw using differences in the carrier phase measurements that are attributable to the phase windup effect with respect to various carriers, as discussed below.

A GNSS receiver that operates in accordance with the invention uses a single antenna that is capable of receiving a plurality of circularly polarized signals (e.g., L1 and L2 signals) which are transmitted by transmitting sources (e.g., GNSS satellites) that are in the view of the GNSS receiver. At a time $t_1$ the GNSS receiver determines a first difference $d_1$ between carrier phase measurements associated with two circularly polarized signals received from the same transmitting source. At a time $t_2$ the GPS receiver determines a second difference $d_2$ between the two carrier phase measurements. The GPS receiver then calculates a third difference $d_3$, which is the difference between the first and second differences. Finally, the receiver determines the relative yaw based on the third difference as:

$$Y_r = (d_3 \times 360°)/\lambda_1 - \lambda_2.$$

As an example, a GPS receiver with a GPS antenna receives L1 and L2 signals transmitted by the GPS satellites then in view. The L1 frequency is 1575.42 MHz=19.029 cm/cycle and the L2 frequency is 1227.6 MHz=24.421 cm/cycle. When the antenna is rotated by 360°, there is a perceived gain/loss of one cycle in the respective carrier phase measurements. The L1 and L2 carrier phase measurements thus include a difference in relative gain/loss of 5.392 cm. The change in heading can thus be determined from the third difference as:

$$Y_r = (d3 \times 360°)/5.392 \text{ cm}$$

As discussed, the GNSS receiver may use other circularly polarized signals received from a given satellite for the calculation of relative yaw. Further, if more than one satellite is in the view of the receiver, the receiver may take a mean average of the third differences associated with the respective satellites and use the result in the calculation of relative yaw.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
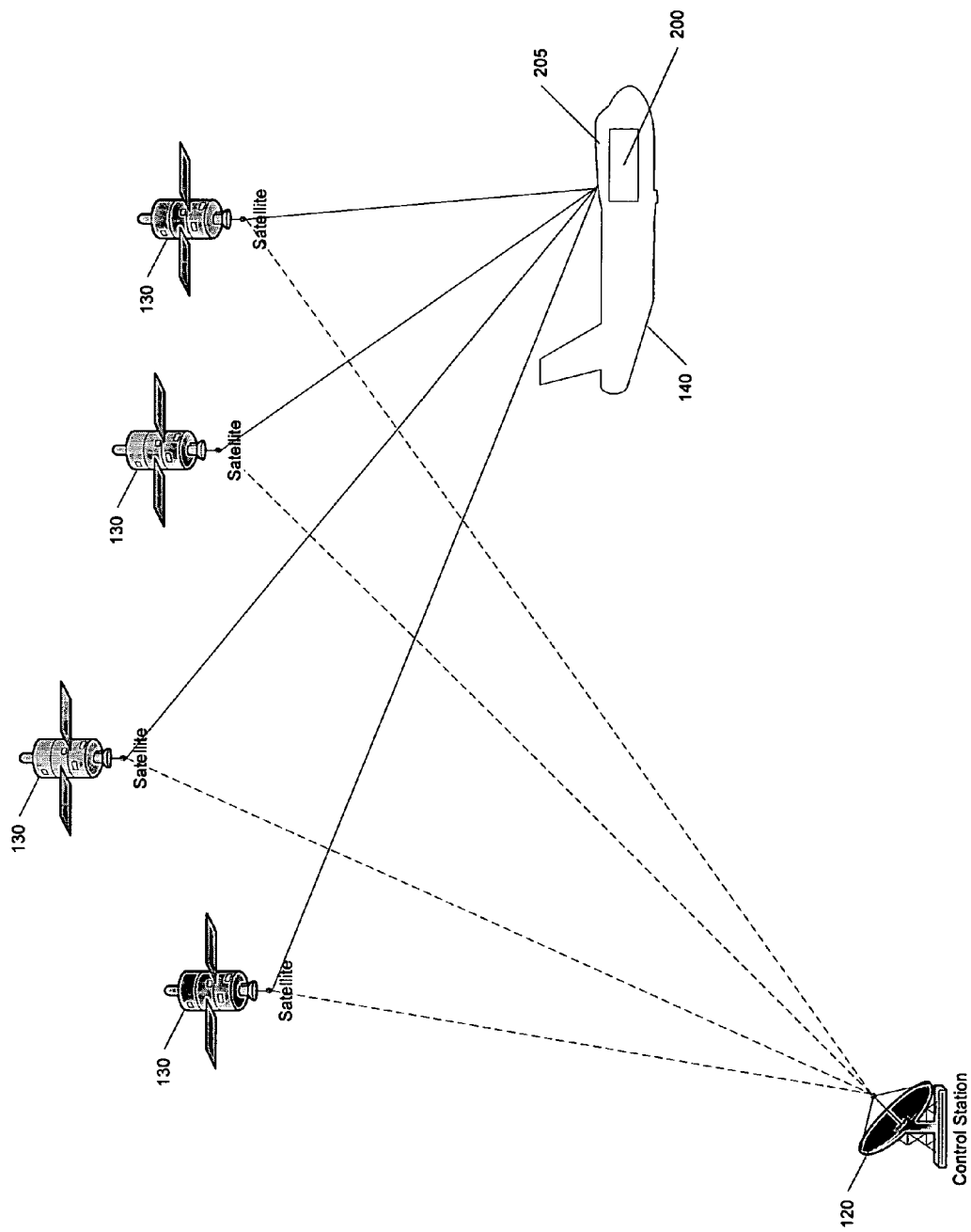
FIG. 1 is a diagram of a Global Positioning System (GPS) that may be used with the present invention.

FIG. 1 illustrates the components of a Global Navigation Satellite System (GNSS), namely, a plurality of GNSS satellites 130 that transmit circularly polarized GNSS signals, a control station 120 that exchanges orbital and clock (time) information with the satellites, and a GNSS receiver 200 that is carried by a moving craft 140. The control station 120 exchanges information with the satellites and provides the satellites with satellite position data sometimes referred to as "ephemeris data." The satellites 130, in turn, include the ephemeris data in the transmitted GNSS signals.

Each GNSS satellite 130 transmits right-hand circularly polarized signals on at least two carrier frequencies. In the example, the GNSS satellites are GPS satellites that transmit signals over L1 and L2 frequency bands. The L1 signals are modulated with the data as well as conventional pseudorandom (PRN) codes including e.g., a precise code (P-code) and a clear/acquisition code (C/A-code). The L2 signals are modulated with the P-code.

The GNSS receiver 200, which operates in accordance with the present invention, uses a single GPS antenna 205 to receive the L1 and L2 GPS signals transmitted by the satellites 130. The GNSS receiver processes the received signals in a conventional manner to determine position, and further processes the received signals in accordance with the inventive technique to determine relative yaw, as discussed in more detail below with reference to FIG. 3.

The craft 140 is illustratively presented as an aircraft, although the inventive technique may be used with other crafts, such as spacecraft, watercraft (e.g., a ship or boat) and land-based craft (e.g., an automobile). The inventive technique may also be used with a handheld GNSS receiver (not shown).

Figure 2:
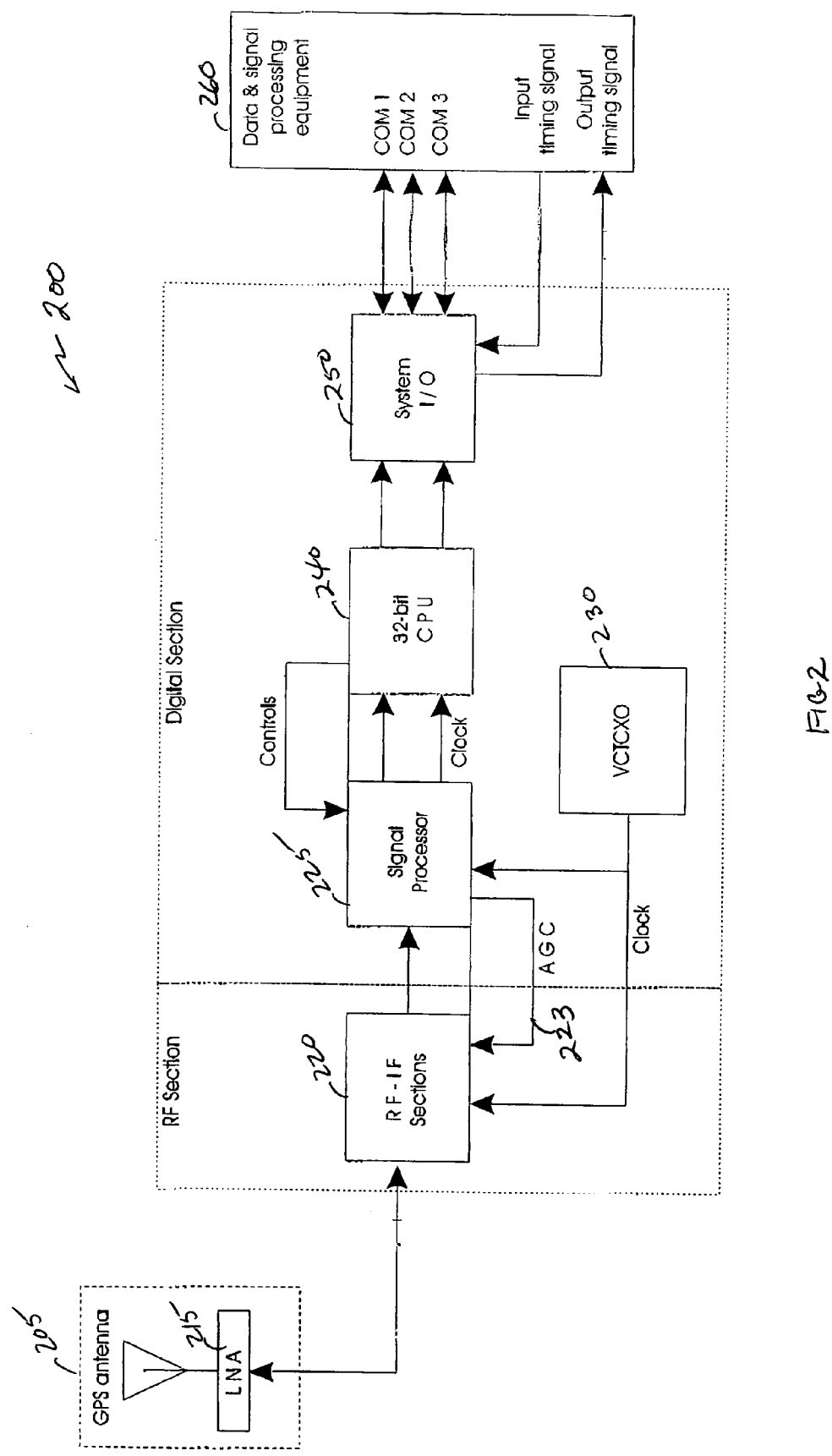
FIG. 2 is a block diagram of a GPS receiver that may be used with the present invention.

FIG. 2 is a schematic block diagram of a GNSS receiver 200 that may be used with the present invention. Receiver 200 comprises various components including the GPS antenna 205, a low-noise amplifier 215, various radio frequency (RF) intermediate frequency (IF) sections 220, a signal processor 225, an oscillator/clock generator 230, a central processing unit (CPU) 240 and an input/output (I/O) system 250. The receiver 200 is configured to receive and process the right-hand circularly polarized signals transmitted by one or more of the satellites 130. It should be noted that the satellites 130 may be configured to transmit left-hand circularly polarized signals and an apparatus configured to process the left-hand circularly polarized signals may take advantage of the inventive technique.

The antenna 205 is illustratively a GPS antenna that is capable of receiving the L1 and L2 signals transmitted by the satellites 130 and providing the L1 and L2 signals to the LNA 215. LNA 215 contains conventional low-noise amplifier circuitry configured to amplify the L1 and L2 signals received by antenna 205. The amplified carrier signals are then provided by the LNA 215 to the RF-IF sections 220 which contain circuitry configured to downconvert the L1 and L2 signals to IF signals and provide digital signal samples to the signal processor 225. The RF-IF sections operate in a known manner in conjunction with clock signals provided by the oscillator/clock generator 230 and automatic gain control signals supplied by the signal processor on line 223. The signal processor and the CPU 240 operate in a known manner to synchronized locally generated PRN codes and carriers with the codes and carriers of the received L1 and L2 signals, and to determine L1 and L2 carrier phase measurements and an associated GPS position.

As discussed in more detail below, the CPU 240 further performs the operations required to determine the relative yaw of the craft 140 (FIG. 1) in accordance with the inventive technique as discussed in more detail below with reference to FIG. 3.

The I/O system 250 provides the GPS position information and, as appropriate, other information to data and signal processing equipment 260. The data and signal processing equipment may further process the information and/or provide navigation information to a user as a read out of position, change in heading, i.e., relative yaw, and so forth or as an indication of position, relative yaw and so forth on a map or chart (not shown). Alternatively, the receiver may provide the L1 and L2 carrier phase measurements to the data and signal processing equipment and the equipment determines the relative yaw as part of post processing activities.

The inventive technique determines relative yaw by taking advantage of "phase windup," which is a well-known effect associated with circularly polarized signals. Phase windup involves the perceived gain or loss of carrier cycles when an antenna at a receiving station (e.g., a GNSS receiver) is rotated in the same direction as or a direction that differs from the circular polarization of the signal transmitted by a transmitting station (e.g., a GPS satellite). If the rotation of the receiving station's antenna is in the same direction as the circular polarization, a cycle is gained for each 360° of rotation and/or a portion of a cycle is gained when the rotation consists of or includes a portion that is less than 360°. Likewise, in accordance with the effect, if the rotation of the receiving station's antenna is rotated in a direction that is opposite the circular polarization, one or more cycles and/or a portion of a cycle is lost.

Conventionally, phase windup is considered a source of error or noise that affects the carrier phase measurements and associated position calculations of a GNSS receiver. The associated errors are essentially the same for all of the satellites in view. Accordingly, the errors, that is, the results of the phase windup effect, are eliminated in GNSS receivers that determine position based on double differenced carrier phase measurements, that is, carrier phase measurements that are differenced across both time and satellites.

We, however, have determined that phase windup information associated with one or more of the satellites may, over time, be used to determine relative yaw. Accordingly, we have determined that the relative yaw may calculated by a GNSS receiver that uses a single antenna to receive at least two GNSS signals from respective GNSS satellites. Further, in contrast to prior receivers that require signals from a plurality of satellites, the current receiver may determine relative yaw using the signals received from a single satellite.

Figure 3:
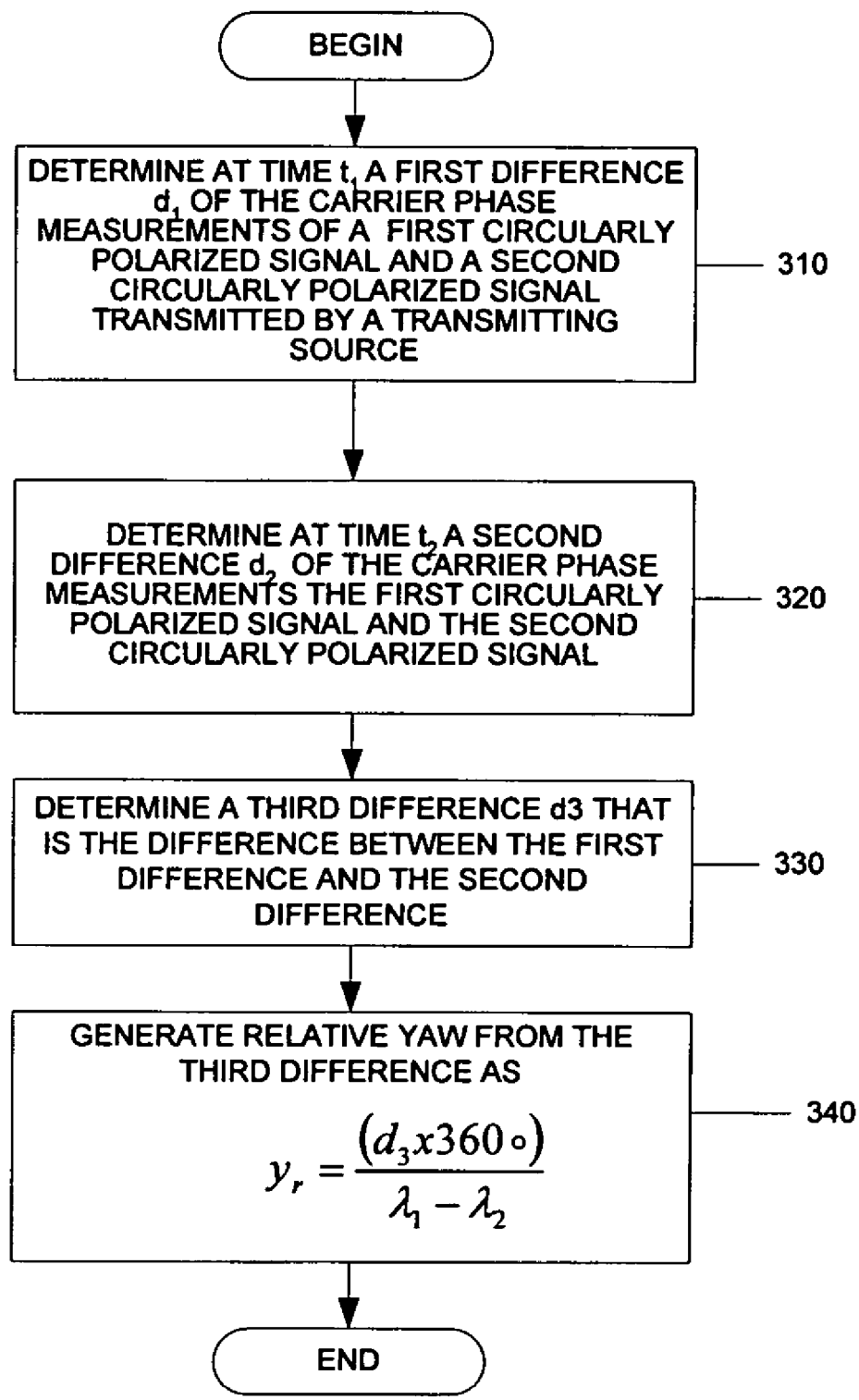
FIG. 3 is a flow chart of a sequence of steps that may be used to configure a GPS receiver to operate in accordance with the present invention.

FIG. 3 is a flow chart of a sequence of steps that may be used to configure the GNSS receiver 200 to determine relative yaw in accordance with the inventive technique. The following sequence will be described as it applies to the signals received from a single satellite 130 that is transmitting L1 and L2 GPS signals. It should be noted, however, that the sequence of steps may adapted to work with any number of satellites that are in view of the receiver as well as with other circularly polarized signals transmitted by the respective satellites.

Using the example of GPS signals, the L1 and L2 carrier signals from each of the satellites 130 are transmitted at the frequencies 1575.42 MHz=19.029 cm/cycle and 1227.6 MHz=24.421 cm/cycle, respectively. A 360-degree rotation of the antenna 205 about the z-axis results in a gain or loss of one carrier cycle. Accordingly, a 360° rotation of the antenna results in L1 and L2 carrier phase measurements that include changes of 19.029 cm and 24.421 cm, respectively. There is thus a difference of 5.392 cm between the L1 and L2 carrier phase measurements that is attributable to the phase windup effect. For rotations of less than 360°, the difference in the carrier phase measurements will be proportionately less. Thus, the system can determine relative yaw based on the phase windup effects associated with the various carrier signals.

At time $t_1$, the GNSS receiver 200 makes carrier phase measurements associated with the L1 signals and the L2 signals received from a given satellite 130. The carrier phase measurements are in units of carrier cycles and are readily converted to distances based on the signal frequencies. The receiver 200 then calculates a first difference, $d_1$, as the difference between the L1 and L2 carrier phase measurements (step 310). At time $t_2$ the GPS receiver 200 further makes carrier phase measurements associated with the L1 signals and the L2 signals received from the same satellite and calculates a second difference, $d_2$, as the difference between the two carrier phase measurements (step 320). At Step 330, the GPS receiver 200 determines a third difference, $d_3$, as the difference between the first and second differences. At Step 340, the GPS receiver 200 calculates the relative yaw, that is, the change in heading over the time period $t_1$ to $t_2$, in terms of the number of degrees of rotation as:

$$Y_r = (d_3 \times 360°)/(\lambda_{L1} - \lambda_{L2}) \quad \text{(eq. 1)}$$

If carrier phase measurements associated with more than one satellite are available, the GNSS receiver 200 takes a mean average of the third differences associated with the respective satellites and uses the result $d_{3ave}$ in equation 1 in place of the $d_3$ associated with the signals received from a particular satellite. Using the differences associated with more than one satellite tends to improve the accuracy of the calculated relative yaw.

It should be noted that the example describes the invention in terms of transmitting sources comprising GPS satellites. However, the inventive technique may be applied in other types of systems that use circularly polarized signals transmitted by other GNSS satellites, with equation 1 including the appropriate wavelengths in the denominator.

The above-described embodiments are meant to be illustrative of the inventive technique. It will be apparent that other variations and modifications may be made to the described embodiments, with the attainment of some or all of their advantages. For example, the relative yaw may be calculated by the post processing equipment or by other equipment based on recorded carrier phase measurements. Further, the calculated values of relative yaw may be accumulated over time to determine an overall relative yaw. Also, the receiver and antenna may operate with left-hand circularly polarized signals. Also, the signal processor and CPU and/or other receiver and/or system components may be combined into a single processor or may consist of a plurality of processors. Also, the inventive technique may be used in a hand-held GNSS receiver to determine changes in relative heading. Therefore, it is an object of the appended claims to cover all such variations and modifications as come within the true spirit and scope of the invention.

What is claimed is:

1. A method for determining relative yaw of a craft from a plurality of circularly polarized transmitted signals, the method comprising the steps of:

A. determining, at a time $t_1$, a first difference $d_1$ of carrier phase measurements associated with a first circularly polarized signal transmitted by a transmitting source and a second circularly polarized signal transmitted by the transmitting source, B. determining, at a time $t_2$, a second difference $d_2$ of the carrier phase measurements associated with the first circularly polarized signal transmitted by the transmitting source and the second circularly polarized signal transmitted by the transmitting source, C. determining a third difference $d_3$ as the difference between the first and second differences, and D. determining the relative yaw from the third difference $d_3$ and a difference in the wavelengths of the first and second circularly polarized signals.

2. A method as defined in claim 1 wherein the step of determining the relative yaw further includes calculating the number of degrees of rotation over the time period from $t_1$ to $t_2$ as:

$$Y_r = (d_3 \times 360°)/(\lambda_1 - \lambda_2)$$

where $\lambda_j$ is the wavelength of the jth circularly polarized signal transmitted by the transmitting source.

3. A method as defined in claim 1 wherein the transmitting source is a GNSS satellite.

4. A method as defined in claim 1 wherein the method further includes
   repeating steps A-C using the first and second circularly polarized signals transmitted by one or more other transmitting sources,
   determining a mean average of the third differences associated with the respective transmitting sources, and
   using the mean average in place of the third difference in determining the relative yaw.

5. A method as defined in claim 4 wherein the step of determining the relative yaw further includes calculating the number of degrees of rotation over the time period from $t_1$ to $t_2$ as:

$$Y_r = (d_{3ave} \times 360°)/(\lambda_1 - \lambda_2)$$

where $\lambda_j$ is the wavelength of the jth circularly polarized signal transmitted by the transmitting source, and $d_{3ave}$ is the mean average of the third differences.

6. A method as defined in claim 1 wherein the craft is an aircraft.

7. A method as defined in claim 1 wherein the craft is a watercraft.

8. A method as defined in claim 1 wherein the craft is a land-based craft.

9. A method as defined in claim 1 wherein the craft corresponds to a hand-held GNSS receiver.

10. A method as defined in claim 1 wherein the craft is a spacecraft.

11. A method as defined in claim 1 wherein the first circularly polarized signal and the second circularly polarized signal are left-handed circularly polarized signals.

12. A method as defined in claim 1 wherein the first circularly polarized signal and the second circularly polarized signal are right-handed circularly polarized signals.

13. A GNSS receiver including
    A. an antenna for receiving a plurality of circularly polarized signals transmitted from at least one GNSS satellite,
    B. one or more processors for determining relative yaw, the processors—
       determining, at a time $t_1$, a first difference $d_1$ of a carrier phase measurement associated with a first circularly polarized signal received by the antenna from a transmitting source and a carrier phase measurement associated with a second circularly polarized signal received by the antenna from the transmitting source, determining, at a time t2, a second difference $d_2$ of the carrier phase measurements associated with the first circularly polarized signal received by the antenna from the transmitting source and the second circularly polarized signal received by the antenna from the transmitting source, determining a third difference $d_3$ which is the difference between the first and second differences; and determining the relative yaw from the third difference $d_3$ and a difference in the wavelengths of the first and second circularly polarized signals.

14. The GNSS receiver defined in claim 13 wherein the one or more processors determine relative yaw by calculating the number of degrees of rotation over the time period from $t_1$ to $t_2$ as:

$$Y_r = (d_3 \times 360°)/(\lambda_1 - \lambda_2)$$

where $\lambda_j$ is the wavelength of the jth circularly polarized signal transmitted by the transmitting source.

15. The GNSS receiver as defined in claim 13 wherein the one or more processors determine third differences associated with the first and second circularly polarized signals received by the antenna from respective GNSS satellites, and use a mean average of the third differences to determine relative yaw.

16. The GNSS receiver defined in claim 15 wherein the one or more processors determine relative yaw by calculating the number of degrees of rotation over the time period from $t_1$ to $t_2$ as:

$$Y_r = (d_{3ave} \times 360°)/(\lambda_1 - \lambda_2)$$

where $\lambda_j$ is the wavelength of the jth circularly polarized signal transmitted by the transmitting source.

17. The GNSS receiver as defined in claim 13 wherein the signal processor accumulates the relative yaw values over an extended period of time.

18. A computer readable medium comprising computer executable instructions for:

determining, at a time $t_1$, a first difference $d_1$ of carrier phase measurements associated with a first circularly polarized signal transmitted by a transmitting source and a second circularly polarized signal transmitted by the transmitting source, determining, at a time $t_2$, a second difference $d_2$ of carrier phase measurements associated with the first circularly polarized signal transmitted by the transmitting source and the second circularly polarized signal transmitted by the transmitting source, and determining a third difference $d_3$ which is the difference between the first and second differences; and determining the relative yaw from the third difference $d_3$ and a difference in the wavelengths of the first and second circularly polarized signals.

19. A computer readable medium as defined in claim 18 further configured to determine the relative yaw by calculating the number of degrees of rotation over the time period from $t_1$ to $t_2$ as:

$$Y_r = (d_3 \times 360°)/(\lambda_1 - \lambda_2)$$

where $\lambda_j$ is the wavelength of the jth circularly polarized signal transmitted by the transmitting source.

20. A computer readable medium as defined in claim 18 wherein the transmitting source is a GNSS satellite.

21. A computer readable medium as defined in claim 18 further configured to repeat the instructions using the first and second circularly polarized signals transmitted by other transmitting sources to determine third differences for the respective transmitting sources, and take a mean average $d_{3ave}$ of the third differences, and use the mean average in place of the third difference in determining the relative yaw.

22. A computer readable medium as defined in claim 21 further configured to determine the relative yaw by calculating the number of degrees of rotation over the time period from $t_1$ to $t_2$ as:

$$Y_r = (d_{3ave} \times 360°)/(\lambda_1 - \lambda_2)$$

where $\lambda_j$ is the wavelength of the jth circularly polarized signal transmitted by the transmitting source.

* * * * *